March 14, 1961  E. B. O'NEIL  2,975,297
ELECTRICAL CONNECTOR
Filed July 15, 1959
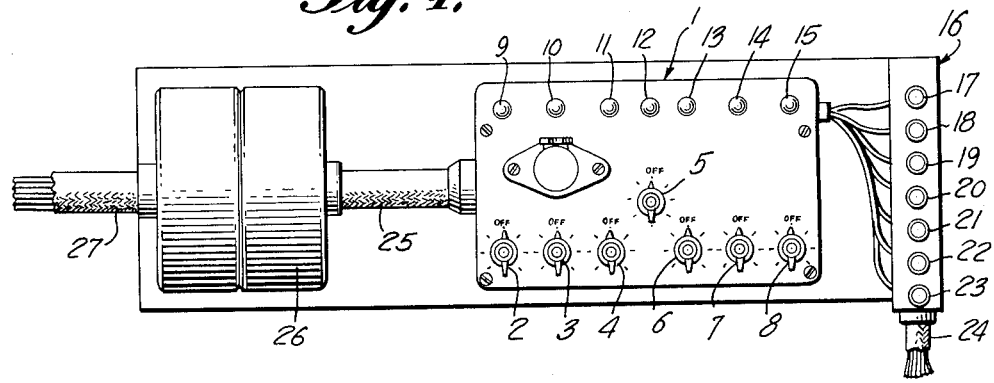
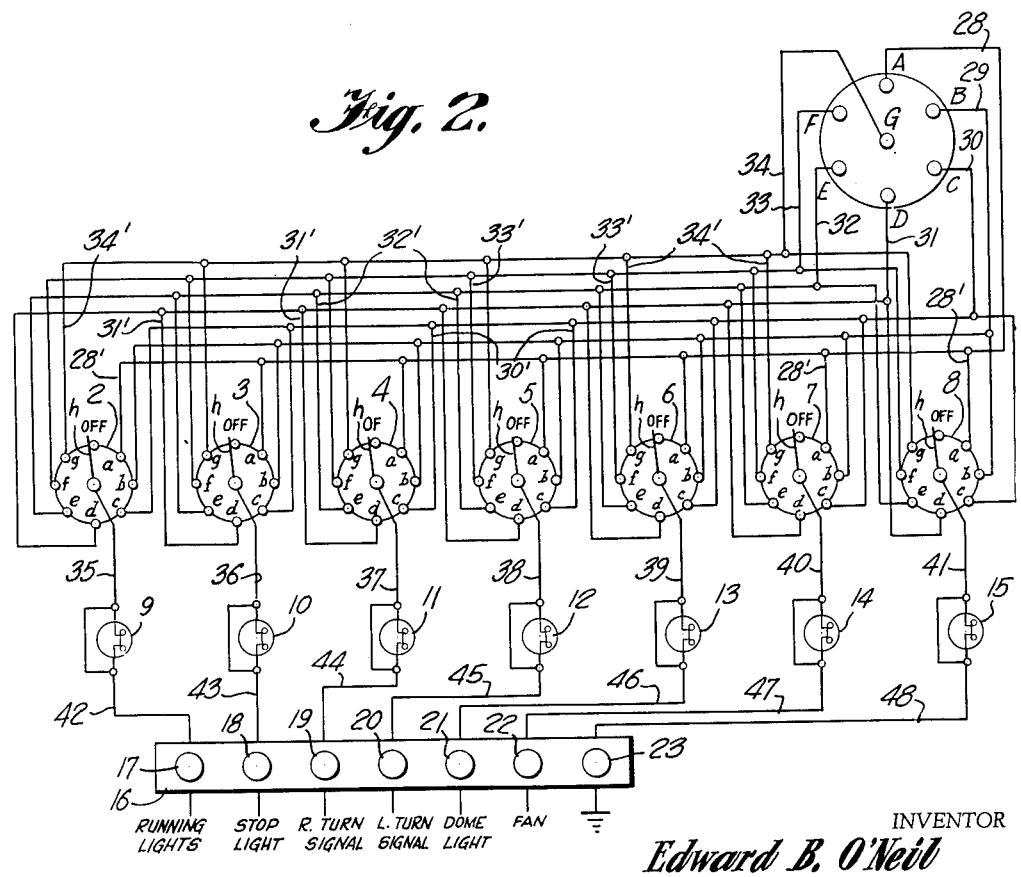
INVENTOR
Edward B. O'Neil
BY Mason, Fenwick & Lawrence
ATTORNEYS

United States Patent Office 2,975,297
Patented Mar. 14, 1961

2,975,297

ELECTRICAL CONNECTOR

Edward B. O'Neil, 2587 Orchard St., Jacksonville, Fla.

Filed July 15, 1959, Ser. No. 827,314

2 Claims. (Cl. 307—10)

This invention relates to electrical connectors, and more particularly to electrical connectors for interconnecting the electric systems of towing and towed vehicles, such as tractors and trailers.

It is common practice to use one tractor interchangeably with a plurality of trailers, and to have one trailer hauled by a number of tractors over a period of time. While all tractors and trailers are provided with plug connectors for coupling the electric systems, different trucks and different trailers are wired differently. Different vehicles even have different numbers of circuits. For example, some vehicles are equipped with four circuits, others six and still others seven. When a trailer is wired for one system and then connected to a tractor which is wired differently, the interconnecting plugs have to be re-wired before the trailer lights can be operated from the tractor.

The object of the present invention is to provide a connector by means of which the electric systems of any towing and towed vehicles can be readily connected and the lights and signals properly operated without need for changing any wires.

Another object is to provide a connector of this nature which will be operative regardless of the number of circuits to be interconnected on the two vehicles.

A further object is the provision of a connector which makes it possible to dial the proper connections for the circuits, and provide visual means to indicate when the circuits are made.

A still further object is to provide such a connector which can be used on either the towed or towing vehicle.

Yet another object is to provide a connector which will permit the coupling of tractors and trailers having different numbers of circuits and interconnecting those which are common to the two and rendering the other inoperative.

Other objects of the invention will become apparent from the following description of one practical embodiment thereof, when taken in conjunction with the drawings which accompany, and form part of, this specification.

In the drawings:

Figure 1 is a plan view of a connector constructed in accordance with the principles of the present invention, shown in conjunction with a circuit breaker panel and connector plug; and Figure 2 is an electric diagram illustrating the circuits of the connector.

In general, the invention contemplates a connector having a plurality of switches, equal in number to the maximum number of circuits used on tractors and trailers, with each switch having a plurality of contacts equal to the number of circuits, and each switch connected to the plug for interconnecting the vehicles. Each switch may be dialed to establish the proper connections for the line it controls.

Referring to the drawings in detail, there is shown in Figure 1 a connector box 1, in which is mounted a plurality of switches 2, 3, 4, 5, 6, 7 and 8. As seven circuits are the maximum number now used on tractors and trailers, seven switches have been illustrated. It will be understood, however, that a different number may be used if desired. The box also contains a plurality of lights 9, 10, 11, 12, 13, 14 and 15, equal in number to the switches and mounted in the box so that each light is above, and in alignment with, one of the switches. The box is used in conjunction with a circuit breaker panel 16, carrying circuit breakers 17, 18, 19, 20, 21, 22 and 23. The circuit breakers and panel form no part of the invention, but are shown to illustrate the manner in which the box is connected into the circuits. Wire cable 24 leads fram the panel 16 to the several lights, or controls, to be operated on the trailer, for example. The box is also connected by cable 25 to a plug connector 26 which couples the cable 25 to the cable 27 leading from the tractor. Cable 24 carries the bundle of wires leading to the trailer lights and signals, and cable 25 carries the wires leading from the connector box to the plug 26.

The switches, lights, circuit breakers and plug 26 are wired as shown in Figure 2. The plug 26 is a seven wire plug, and has connector prongs or sockets, as the case may be, A, B, C, D, E, F and G. Each switch has seven contacts $a$, $b$, $c$, $d$, $e$, $f$ and $g$ and an "off" position. Each switch has a movable arm $h$ which can be rotated to the "off" position, or to contact any one of the seven switch contacts.

The plug 26 is so wired to the switches that each prong of the plug has a lead going to the corresponding contact of each switch. For example, a wire 28 leads from the prong A of the plug and wires 28' lead from the wire 28 to the contacts $a$ of each switch. A wire 29 leads from prong B, and wires 29' connect wire 29 with each switch contact $b$. The same arrangement is true with wires 30, 31, 32, 33 and 34 and the connecting wires 30', 31', 32', 33' and 34'. Thus, there is a connection from each switch contact $a$ to plug prong A, from each switch contact $b$ to plug prong B, from each switch contact $c$ to plug prong C, etc.

The switch arms $h$ are connected by means of wires 35, 36, 37, 38, 39, 40 and 41 with the companion lights 9, 10, 11, 12, 13, 14 and 15. The lights, in turn, are connected to the several circuit breakers by wires 42, 43, 44, 45, 46, 47 and 48, and the circuit breakers are connected to the lights, signals, etc. to be actuated. In the embodiment shown, switch 2 is connected to light 9, circuit braker 17 and to the remaining lights of the vehicle. Switch 3 is connected to light 10, circuit breaker 18 and the stop light. Switch 4 controls the right turn signal. Switch 5 is connected to the left turn signal. Switch 6 controls the dome light, switch 7 a fan, and switch 8 connects to ground.

With the arrangement disclosed, any one of the circuits can be connected to any one of the plug prongs. Thus, no matter which prong of plug 26 is coupled to the running light circuit of the other vehicle switch 2 can be dialed to make contact between its arm $h$ and the switch contact wired to that plug prong. For instance, if prong C of the plug is connected to the running light line, switch arm $h$ of switch 2 will be moved to contact $c$ to establish the circuit. It is not necessary, however, that the operator know which contact is to be energized.

In using the device a trailer will be coupled to a tractor and plug 26 coupled. The operator will then turn on the running lights of the tractor and rotate switch arm $h$ of switch 2 until light 9 comes on. He will then know that the running light circuit is established. Next the tractor stop light will be actuated and arm $h$ of switch 3 rotated until light 10 is illuminated. The same procedure will be followed with the switches controlling the remaining circuits to be used. Any circuits which are not to be used will be closed off by moving their switches to "off" position.

It will be evident from the above description that any trailer may have its electric system coupled to any tractor and the circuits completed without changing any of the wiring. The circuits may be established quickly and surely, without the operator leaving the connector to check after each adjustment to ascertain if the circuit is made. The connector can be made and installed at low cost.

While in the above one practical embodiment of the invention has been disclosed, it will be understood that the details of construction shown and described are merely by way of example, and the invention may take other forms within the scope of the appended claims.

What is claimed is:

1. A connector for the electric systems of connectable vehicles each having a plurality of electric circuits with the wires of the several circuits of the respective vehicles connected to the respective sections of a separable plug comprising, a housing, a plurality of switches equal in number to the circuits of the vehicle having the greater number, each switch having a movable arm, a wire leading from each movable arm for connecting one to a circuit of one of the vehicles, each switch having a number of contacts equal to the number of switches engageable by the movable arm, means for connecting similar contacts of all switches to each of the circuits leading to the plug section of said one vehicle, whereby manipulation of the movable arms of the switches will connect any wire from the plug section to any circuit of the said one vehicle.

2. A connector for the electric systems of connectable vehicles as claimed in claim 1 wherein there is a signal light mounted in said housing for each of said switches interposed in the wires leading from the movable arms of the switches, whereby visual indication will be given when a circuit is established between the vehicles.

References Cited in the file of this patent

UNITED STATES PATENTS

Re. 24,259    Hunt _____ Dec. 25, 1956